United States Patent
Zou et al.

(10) Patent No.: US 10,700,858 B2
(45) Date of Patent: Jun. 30, 2020

(54) METHOD FOR REALIZING NETWORK ELECTRONIC IDENTITY IDENTIFICATION INFORMATION PROTECTION BASED ON KEY DISPERSION CALCULATION

(71) Applicant: THE THIRD INSTITUTE OF THE MINISTRY OF PUBLIC SECURITY, Shanghai (CN)

(72) Inventors: Xiang Zou, Shanghai (CN); Minghui Yang, Shanghai (CN); Lishun Ni, Shanghai (CN); Yixin Xu, Shanghai (CN); Jun Huang, Shanghai (CN)

(73) Assignee: THE THIRD INSTITUTE OF THE MINISTRY OF PUBLIC SECURITY, Shanghai (CN)

( * ) Notice: Subject to any disclaimer, the term of this patent is extended or adjusted under 35 U.S.C. 154(b) by 443 days.

(21) Appl. No.: 15/531,822

(22) PCT Filed: Dec. 31, 2014

(86) PCT No.: PCT/CN2014/096009
§ 371 (c)(1),
(2) Date: Nov. 7, 2017

(87) PCT Pub. No.: WO2016/086490
PCT Pub. Date: Jun. 9, 2016

(65) Prior Publication Data
US 2018/0062840 A1    Mar. 1, 2018

(30) Foreign Application Priority Data
Dec. 1, 2014 (CN) .......................... 2014 1 0719446

(51) Int. Cl.
*H04L 9/00* (2006.01)
*H04L 9/08* (2006.01)
*H04L 9/14* (2006.01)

(52) U.S. Cl.
CPC .......... *H04L 9/0869* (2013.01); *H04L 9/0822* (2013.01); *H04L 9/0866* (2013.01); *H04L 9/14* (2013.01); *H04L 2209/34* (2013.01)

(58) Field of Classification Search
CPC ........ H04L 9/0869; H04L 9/14; H04L 9/0822
See application file for complete search history.

(56) References Cited

U.S. PATENT DOCUMENTS 6,769,062 B1 * 7/2004 Smeets ................... G06F 7/723
    713/150
2008/0019505 A1 * 1/2008 Thomas .............. G06F 21/6209
    380/28

(Continued)

FOREIGN PATENT DOCUMENTS

| CN | 101068143 A | 11/2007 |
| CN | 103096318 A | 5/2013 |
| CN | 103795728 A | 5/2014 |

*Primary Examiner* — Jeffrey C Pwu
*Assistant Examiner* — Helai Salehi
(74) *Attorney, Agent, or Firm* — Blue Filament Law PLLC

(57) ABSTRACT

A method is provided that protects electronic Identity information based on key derived operation. The method includes using an electronic Identity server to send an application derived identifier of the application and user electronic Identity code to a host security module that randomly generates an application master key, encrypts the application derived identifier with the application master key, and gets an application encryption key. The host security module encrypts the user electronic Identity code with the application encryption key, and gets an encryption document. The electronic Identity server codes the encryption document and an application identity code, and gets an application electronic Identity code. The electronic Identity server uses the application electronic Identity code as the user identifier.

11 Claims, 3 Drawing Sheets

(56) References Cited

U.S. PATENT DOCUMENTS

2008/0304664 A1* 12/2008 Suthaharan .......... H04L 9/0662
  380/46
2013/0124860 A1*  5/2013 Maidl ................. G06F 21/6263
  713/164

* cited by examiner

METHOD FOR REALIZING NETWORK ELECTRONIC IDENTITY IDENTIFICATION INFORMATION PROTECTION BASED ON KEY DISPERSION CALCULATION

FIELD OF TECHNOLOGY

The invention relates to the cross technical fields of electronic Identity management and information safety, specifically to a method to protect electronic Identity information based on key derived operation.

DESCRIPTION OF RELATED ARTS

Substantial changes have happened in people's lives and working methods in the network age, and personal material and spiritual benefits can be both reflected in the information network. Since 2011, the internet secret-spilling incident detonated the whole information safety community; leading to the traditional user+ password way cannot meet the existing safety needs anymore. The secret-spilling data includes: tianya: 31,758,468 items, CSDN: 6,428,559 items, microblog: 4,442,915 items, renren: 4,445,047 items, maopu: 2,644,726 items, 178: 9,072,819 items, duduniu: 13,891,418 items, 7K7K: 18,282,404 items, Adobe: 1.5 hundred million, Cupid Media: 42000 thousand, QQ database: more than 6 hundred million, Forbes: 1000 thousand, close to 900 million, and so on. The internet changes with each passing day, and all kinds of applications emerge in endlessly, and users usually have same registered habit, that is, using same username and password for accounts on different websites. So the user's information in one website spills, it may be spilled indirectly in other applications in the internet, and it will easily forms butterfly effect of secret-spilling, that is the private date of the users' name, ID card No., address, credit card No., address list, messages, photos, GPS location information and so on of the associated accounts are copied, exposed, sold and bought, then the users will suffer the problems of advertising promotion, spam bombing, telephone harassment, malignancy cheat, blackmail and so on.

Therefore, "Decision related to enhancing the protection of information of the network", shows that electronic Identity management has become the current focus issue concerned by all across the country. Carrying out electronic Identity management, in terms of the whole social public area, can prevent effectively from the phenomenon of inundate of false information, bad information caused by abuse of Internet virtuality; in terms of people's livelihood service, can provide social public service, and provide convenience for citizens; in terms of commercial service, can solve the problem of network transaction integrity, which is an urgent demand for the harmonious development of our society. Entering big data age, realizing electronic Identity management not only needs to identify and verify the authenticity and effectiveness of citizens' network identity, but also needs to prevent several applications from revealing personal private information caused by active (commercial data exchange) or passive (information be dragged out of a database) account information converge and data analysis, then direct or indirect damage will be caused by this.

Existing account management system self-built by each rely party (that is provider of network application service) has serious defect in terms of personal electronic Identity identify veracity and identity information protection, the big scale information revealing as above is caused and serious damage has caused for the rely party itself and its users.

The proposal "relevance comparison" widely used at present, during the process of completing identity information verify, causes the revealing of personal identity information easily, and it will cause a whole revealing of all personal network behavior in big data environment, which will cause the damage more serious.

The electronic Identity (eID for short) is an authority electronic information document proving personal identity remotely on the network, signed and issued uniformly by "Ministry of Public Security citizen electronic Identity identify system", which is based on cryptographic algorithm, carried by secure chips, and used to prove the identity remotely on the network for the citizens, its coding has protected true personal identity information in design. But under the account information converge and data analysis condition if all facing rely part uses only code, personal identity information is still easily to be revealed. So, a method of generating electronic Identity code of facing rely part needs to be designed to solve the problems of electronic Identity management and personal privacy protection under big data environment safely and effectively.

SUMMARY OF THE INVENTION

The present invention aims to overcome the above drawbacks of the prior arts, and provide a method to protect electronic Identity information based on key derived operation, which can exactly identify and verify the authenticity and effectiveness, and to prevent the personal private information from revealing resulted from active or passive account information gathering and data analysis, and solve the problem of electronic Identity management and personal private protection under the big data environment safely and effectively.

To achieve the above-mentioned objectives, the method to protect electronic Identity information based on key derived operation has the following composition:

The method to protect electronic Identity information based on key derived operation, has the following characteristics, the method is based on electronic Identity serve system, the system includes clients, a host security module and an electronic Identity server, the method comprises the following steps:

(1) The electronic Identity server sends the application derived identifier of the application and user electronic Identity code to the host security module;

(2) The host security module generates randomly an application master key, encrypts the application derived identifier with the application master key, and gets an application encryption key;

(3) The host security module encrypts the user electronic Identity code with the application encryption key, and gets an encryption document;

(4) The host security module sends the encryption document to the electronic Identity server;

(5) The electronic Identity server codes the encryption document and an application identity code, and gets an application electronic Identity code;

(6) The electronic Identity server uses the application electronic Identity code as the user identifier.

Further, before the step (1), the method further comprises the following step:

(0) the host security module generates an application master key matrix including several application master keys.

Furthermore, the host security module generating randomly an application master key, is specifically:

The host security module selects an application master key randomly from the application master key matrix.

Furthermore, the application master key matrix is a matrix of 16×16.

Further, the encrypting the application derived identifier with the application master key, is specifically:

The host security module encrypts the most significant byte of the application derived identifier with the application master key and gets the most significant byte of the application encryption key, and the host security module encrypts the least significant byte of the application derived identifier with the application master key and gets the least significant byte of the application encryption key.

Furthermore, the encrypting the application derived identifier with the application master key, is specifically:

The host security module encrypts the application derived identifier with the application master key using symmetric encryption algorithm.

Furthermore, the symmetric encryption algorithm is 3DES encryption algorithm, SM1 encryption algorithm or SM4 encryption algorithm.

Furthermore, the host security module encrypts the user electronic Identity code with the application encryption key, is specifically:

The host security module encrypts the user electronic Identity code with the application encryption key using symmetric encryption algorithm.

Furthermore, the symmetric encryption algorithm is 3DES encryption algorithm, SM1 encryption algorithm or SM4 encryption algorithm.

Further, the electronic Identity server codes the encryption document and an application identity code, is specifically:

The electronic Identity server splices the encryption document and an application identity code, and process Base64 coding after the encryption document and the application identity code are spliced.

Further, before the step (1), the method further comprises the following step:

(a) The electronic Identity server distributes an application identity code and an application derived identifier to each registered application, and save the application identity code and the application derived identifier to the database.

Further, the application derived identifier is a binary identifier of 16 bytes, and the application identity code is an identifier of 48 bytes.

The method to protect electronic Identity information based on key derived operation faces rely part (that is provider of network application service), it not only can identify and verify accurately the authenticity and effectiveness of citizens electronic Identity, but also can prevent several applications from revealing personal private information caused by active (commercial data exchange) or passive (information be dragged out of a database) account information converge and data analysis, solve the problems of electronic Identity management and personal privacy protection under big data environment safely and effectively. It has the following positive benefits:

1. The application electronic Identity code has anonymity; it will not reveal the electronic Identity code and any other personal identity information. After being encryption protected with cryptographic algorithm (3DES/SM1/SM4), users' true identity related information is hided.

2. The application electronic Identity coder has uniqueness, users have different codes on each application, and all users have different codes in each application;

3. The application electronic Identity can resist cryptanalysis, the related plain text cannot be gotten through cryptanalysis. Also, each application's application electronic Identity generates a key by separating a master key selected randomly from master key matrix, which is not the same with each other, each one master key is revealed, and the damage caused can be controlled in a smaller scope.

4. The application electronic coder cannot be connected. As the users have different codes on each application, even under the condition of account information coverage and data analysis, the cross-application confirmation of users identity cannot be realized neither.

DETAILED DESCRIPTION OF THE PREFERRED EMBODIMENT

In order to describe the technical content of the present invention more clearly, now describe it further combining specific embodiments.

Figure 1:
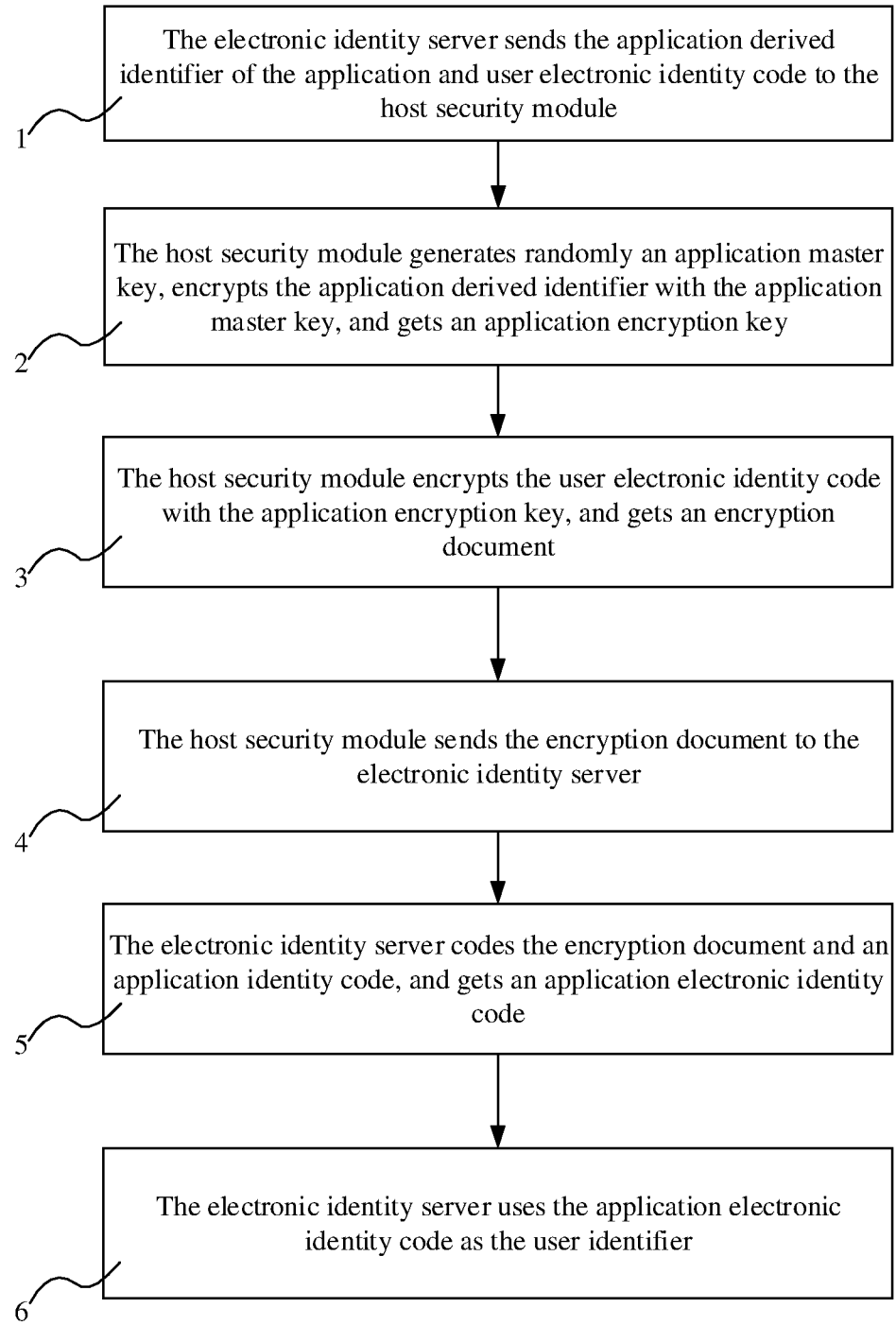
FIG. 1 is the flow diagram of the method to protect electronic Identity information based on key derived operation of the invention.

As shown in FIG. 1, in one embodiment, the method to protect electronic Identity information based on key derived operation, has the following characteristics, the method is based on electronic Identity serve system, the system includes clients, a host security module and an electronic Identity server, the method comprises the following steps:

(1) The electronic Identity server sends the application derived identifier of the application and user electronic Identity code to the host security module;

(2) The host security module generates randomly an application master key, encrypts the application derived identifier with the application master key, and gets an application encryption key;

(3) The host security module encrypts the user electronic Identity code with the application encryption key, and gets an encryption document;

(4) The host security module sends the encryption document to the electronic Identity server;

(5) The electronic Identity server codes the encryption document and an application identity code, and gets an application electronic Identity code;

(6) The electronic Identity server uses the application electronic Identity code as the user identifier.

Wherein, the application derived identifier is a binary identifier of 16 bytes, the encryption document is a document of 32 bytes, and the application identity code is an identifier of 48 bytes.

In a preferable embodiment, before the step (1), it further comprises the following step:

(0) The host security module generates an application master key matrix including several application master keys, wherein, the application master key matrix is a matrix of 16×16.

In a more preferable embodiment, the host security module generating randomly an application master key, is specifically:

The host security module selects an application master key randomly from the application master key matrix.

In a preferable embodiment, the encrypting the application derived identifier with the application master key, is specifically:

The host security module encrypts the most significant byte of the application derived identifier with the application master key and gets the most significant byte of the application encryption key, and the host security module encrypts the least significant byte of the application derived identifier with the application master key and gets the least significant byte of the application encryption key.

In a more preferable embodiment, the encrypting the application derived identifier with the application master key, is specifically:

The host security module encrypts the application derived identifier with the application master key using symmetric encryption algorithm, wherein, the symmetric encryption algorithm is 3DES encryption algorithm, SM1 encryption algorithm or SM4 encryption algorithm.

In a preferable embodiment, the host security module encrypts the user electronic Identity code with the application encryption key, is specifically:

In a more preferable embodiment, the host security module encrypts the user electronic Identity code with the application encryption key using symmetric encryption algorithm, wherein, the symmetric encryption algorithm is 3DES encryption algorithm, SM1 encryption algorithm or SM4 encryption algorithm.

In a preferable embodiment, the electronic Identity server codes the encryption document and an application identity code, is specifically:

The electronic Identity server splices the encryption document and an application identity code, and process Base64 coding after the encryption document and the application identity code are spliced.

In a preferable embodiment, before the step (1), the method further comprises the following step:

(a) The electronic Identity server distributes an application identity code and an application derived identifier to each registered application, and save the application identity code and the application derived identifier to the database.

The invention can be used widely in the application carried by eID in the areas of e-government affairs, electronic commerce, e-bank, online payment and so on, and can realize the safety protection of personal privacy combined with different application keys. Wherein, different application keys are gotten by derived operation according to encryption algorithm. Derive multilevel and step by step from seed data, application master key, zone sub key, card derived key and so on. The object of key dispersion is to make sure that even one sub key is revealed, it won't threat to the safety management of master key, for the master key cannot be deduced from sub key and derived data, the safety of system is enhanced, the safety risk and management cost is lowed, the following are the related concepts of key derived operation:

1) Master key: the key of upper level management center is called master key;
2) Sub key: key derived operated from the master key;
3) Key derived process: the operation process of generating sub keys from master key;
4) Derived data: calculating data used for key dispersion.

Beside, the entities and related key definitions are as follows:

eID service system: a background system providing eID related service. It mainly realizes the whole life cycle business process of eID such as generation, storage, using, maintenance and so on.

rely part: an entity providing network application service rely on eID service system.

eID code: the only identification code generated for each eID user according to related algorithm, the length is 48 bytes, it is recorded as eID_code. But before being encoded with Base64, the users' eID_code (user electronic identity code) has 32 bytes effective fields, it is recorded as $eID\_code_{32}$.

application eID code (application electronic identity code): an electronic identity code used to mark the user in rely part generated according to user's eID_code, one eID user has different identity codes in different applications, it's length is 48 bytes, it is recorded as App_eIDCode.

application identity coder: a 4 bytes binary code assigned for a third party application by the eID service system, used to mark the third party application, recorded as App_ID.

application derived identifier: a 16 bytes binary code assigned for a third party application by the eID service system, stored in the database of eID service platform, used as key derived factor, recorded as App_code.

application master matrix: the application master key is used to generate application encryption key, it is generated, protected and stored by the host security module, the application master matrix consists a group of application master key, it is generally a 16×16 matrix. The master's position in a matrix can be marked by two hexadecimal characters, and it is recorded as MKeyMatrix.

When certain application $App_i$ registers in the eID service system, the eID service system distributes an App_ID, and an $App\_code_i$ to the application $App_i$, and stores it in the database. Hereafter, when the application needs to identify the user, the application $App_i$ requests the eID service system or identifies the user by itself. After the identification is done, the eID service system generates an $App\_eIDCode_i$ and returns it to the application, that is the user's identity code on this application $App_i$ of the eID user is $App\_eIDCode_i$.

Figure 2:
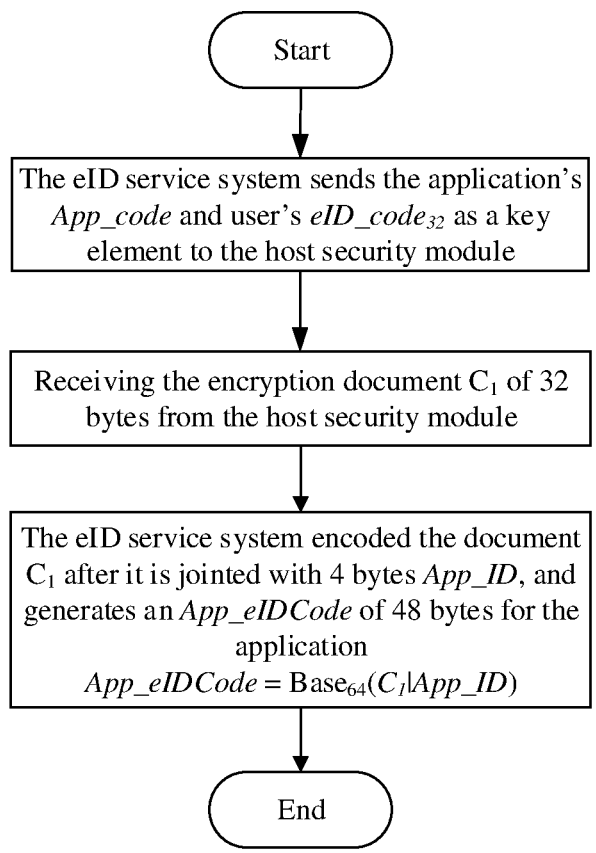
FIG. 2 is the flow diagram of generating application electronic Identity code of one embodiment of the invention.
Figure 3:
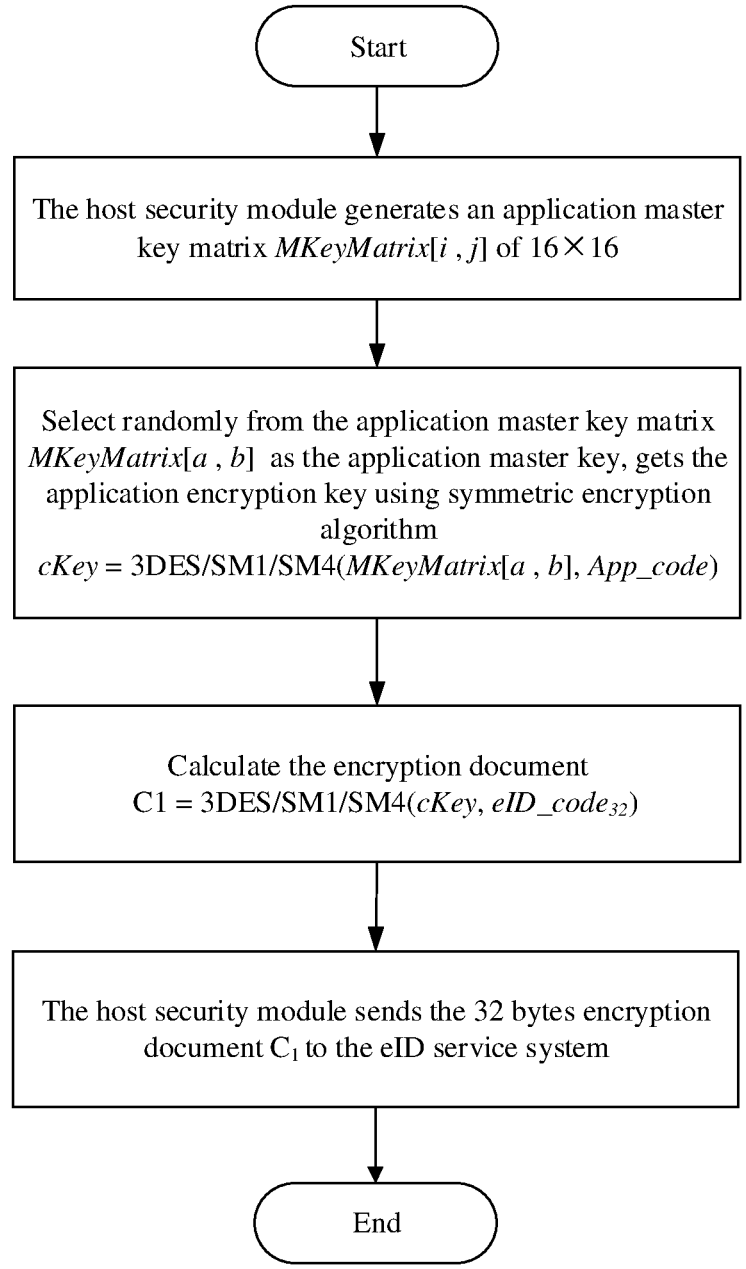
FIG. 3 is the flow diagram of generating encryption cipher of one embodiment of the invention.

The following is the description combining FIG. 2 and FIG. 3 of the key technology of the invention:

1. The flow of generating $App\_eIDCode_i$ for users by the eID service system, can be seen as FIG. 2, the specific steps are as follows:

1) the eID service system sends the application's App_code and user's $eID\_code_{32}$ as a key element to the host security module;
2) receiving the encryption document $C_1$ of 32 bytes from the host security module;
3) the eID service system encoded the document $C_1$ after it is jointed with 4 bytes App_ID, and generates an App_eIDCode of 48 bytes for the application, that is:

App_eIDCode=Base64($C_1$|App_ID)

2. The flow of generates an encryption document by the host security module, can be seen as FIG. 3, the specific steps are as follows:

1) the host security module generates an application master key matrix MKeyMatrix[i,j] of 16×16.
2) the host security module selects randomly from the application master key matrix MKeyMatrix[a, b] (wherein i=a, j=b, a and b are natural number) as the application master key after receiving App_code and $eID\_code_{32}$, gets the application encryption key cKey using symmetric encryption algorithm (such as 3DES/SM1/SM4 and so on), that is:

cKey=3DES/SM1/SM4(MKeyMatrix[a,b], App_code);

3) according to the application encryption key cKey, the host security module encrypts certain user's $eID\_code_{32}$ using symmetric encryption algorithm (such as 3DES/SM1/SM4 and so on), and gets the 32 bytes encryption document $C_1$ of the user generated on this application, that is:

C1=3DES/SM1/SM4(cKey,eID_code$_{32}$);

4) the host security module sends the 32 bytes encryption document C.sub.1 to the eID service system through a private network.

Besides, the following is the description of how the host security module encrypts the user's eID_code32 using symmetric encryption algorithm taking 3DES algorithm for example:

the host security module selects an application master key randomly from the application master key matrix, and process derived operation to 16 bytes APP_Code using 3DES-128 algorithm, the specific algorithm is:

encrypt the most significant byte of APP_Code using the application master key as the most significant byte of the application encryption key, encrypt the least significant byte of APP_Code using the application master key as the least significant byte of the application encryption key, then get the application encryption key cKey.

The method to protect electronic Identity information based on key derived operation faces rely part (that is provider of network application service), it not only can identify and verify accurately the authenticity and effectiveness of citizens electronic Identity, but also can prevent several applications from revealing personal private information caused by active (commercial data exchange) or passive (information be dragged out of a database) account information converge and data analysis, solve the problems of electronic Identity management and personal privacy protection under big data environment safely and effectively. It has the following positive benefits:

1. The application electronic Identity code has anonymity; it will not reveal the electronic Identity code and other personal identity information. After being encryption protected with cryptographic algorithm (3DES/SM1/SM4), users' true identity related information is hided.

2. The application electronic Identity coder has uniqueness, users have different codes on each application, and all users have different codes in each application;

3. The application electronic Identity can resist cryptanalysis, the related plain text cannot be gotten through cryptanalysis. Also, each application's application electronic Identity generates a key by separating a master key selected randomly from master key matrix, which is not the same with each other, each one master key is revealed, the damage caused can be controlled in a smaller scope.

4. The application electronic coder cannot be connected. As the users have different codes on each application, even under the condition of account information coverage and data analysis, the cross-application confirmation of users identity cannot be realized neither.

In this specification, the present invention has been described with reference to the specific embodiments. However, obviously modifications and variations still can be made without departing from the spirit and range of the invention. Accordingly, the specification and drawings are to be regarded as illustrative rather than restrictive.

We claim:

1. A method to protect electronic Identity information based on key derived operation, characterized in that, the method is based on an electronic Identity server system, the system includes clients, a host security module and an electronic Identity server, the method comprises:

(1) the electronic Identity server sending an application derived identifier of an application and a user electronic Identity code to the host security module;

(2) the host security module generates randomly an application master key, encrypts the application derived identifier with the application master key, and gets an application encryption key;

(3) the host security module encrypts the user electronic Identity code with the application encryption key, and gets an encryption document;

(4) the host security module sends the encryption document to the electronic Identity server;

(5) the electronic Identity server codes the encryption document and an application identity code, and gets an application electronic Identity code;

(6) the electronic Identity server uses the application electronic Identity code as the user identifier;

wherein the encrypting the application derived identifier with the application master key further comprises the host security module encrypting a most significant byte of the application derived identifier with the application master key and obtaining a most significant byte of the application encryption key, and the host security module encrypting a least significant byte of the application derived identifier with the application master key and obtaining a least significant byte of the application encryption key.

2. The method according to claim 1, wherein before the step (1), the method further comprises:

(0) the host security module generates an application master key matrix including several application master keys.

3. The method according to claim 1, wherein the encrypting the application derived identifier with the application master key further comprises:

the host security module encrypting the application derived identifier with the application master key using a symmetric encryption algorithm.

4. The method according to claim 1, wherein the host security module encrypts the user electronic Identity code with the application encryption key, where the application encryption key uses a symmetric encryption algorithm.

5. The method according to claim 1, wherein the electronic Identity server codes the encryption document and an application identity code; and wherein the electronic Identity server splices the encryption document and an application identity code, and following the splicing the electronic Identity server Base64 codes the spliced together encryption document and the application identity code.

6. The method according to claim 1, wherein before the step (1), the method further comprises:

(a) the electronic Identity server distributing an application identity code and an application derived identifier to each registered application, and saves the application identity code and the application derived identifier to a database.

7. The method according to claim 1, wherein the application derived identifier is a binary identifier of 16 bytes, and the application identity code is an identifier of 48 bytes.

8. The method according to claim 2, wherein the host security module randomly generates an application master key that is randomly selected from the application master key matrix.

9. The method according to claim 3, wherein the symmetric encryption algorithm is one of an SM1 encryption algorithm or an SM4 encryption algorithm.

10. The method according to claim 4, wherein the symmetric encryption algorithm is one of an SM1 encryption algorithm or a SM4 encryption algorithm.

11. The method according to claim 8, wherein the application master key matrix is a matrix of 16×16.

* * * * *